(12) United States Patent
Greene et al.

(10) Patent No.: US 9,092,265 B2
(45) Date of Patent: Jul. 28, 2015

(54) LONG-TERM RESOURCE PROVISIONING WITH CASCADING ALLOCATIONS

(71) Applicant: Palo Alto Research Center Incorporated, Palo Alto, CA (US)

(72) Inventors: Daniel H. Greene, Sunnyvale, CA (US);
Lara S. Crawford, Los Altos, CA (US);
Maurice K. Chu, Burlingame, CA (US);
John Hanley, Emerald Hills, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 343 days.

(21) Appl. No.: 13/692,912

(22) Filed: Dec. 3, 2012

(65) Prior Publication Data

US 2013/0227584 A1    Aug. 29, 2013

Related U.S. Application Data

(60) Provisional application No. 61/603,365, filed on Feb. 26, 2012.

(51) Int. Cl.
*G06F 9/50* (2006.01)
*G06F 9/48* (2006.01)

(52) U.S. Cl.
CPC .......... *G06F 9/50* (2013.01); *G06F 9/5005* (2013.01); *G06F 9/505* (2013.01); *G06F 9/5038* (2013.01); *G06F 9/5061* (2013.01); *G06F 9/5083* (2013.01); *G06F 9/4881* (2013.01); *Y02B 60/142* (2013.01)

(58) Field of Classification Search
None
See application file for complete search history.

(56) References Cited

U.S. PATENT DOCUMENTS

2007/0256077 A1    11/2007    Zhong
2010/0100877 A1    4/2010    Greene et al.

OTHER PUBLICATIONS

Denneman, Frank, Jun. 8, 2010, "Reservations and CPU scheduling", pp. 1-14.*

* cited by examiner

*Primary Examiner* — Qing Wu
(74) *Attorney, Agent, or Firm* — Shun Yao; Park, Vaughan, Fleming & Dowler LLP

(57) ABSTRACT

One embodiment of the present invention provides a system for provisioning physical resources shared by a plurality of jobs. During operation, the system establishes resource-usage models for the jobs, ranks the jobs based on quality of service (QoS) requirements associated with the jobs, and provisions the jobs for a predetermined time interval in such a way that any unused reservations associated with a first subset of jobs having higher QoS rankings are distributed to other remaining jobs with preference given to a second subset of jobs having a highest QoS ranking among the other remaining jobs. Provisioning the jobs involves making reservations for the jobs based on the resource-usage model and corresponding QoS requirements associated with the jobs.

21 Claims, 5 Drawing Sheets

LONG-TERM RESOURCE PROVISIONING WITH CASCADING ALLOCATIONS

RELATED APPLICATION

This application claims the benefit of U.S. Provisional Application No. 61/603,365, entitled "Long-Term Resource Provisioning with Cascading Allocations," by inventors Daniel H. Greene, Lara S. Crawford, Maurice K. Chu, and John Hanley, filed 26 Feb. 2012.

STATEMENT OF GOVERNMENT-FUNDED RESEARCH

This invention was made with U.S. Government support under Contract No. DE-EE0002898(3698), awarded by the Government DOE/Power Assure. The U.S. Government has certain rights in this invention.

BACKGROUND

Related Art

This disclosure is generally related to data center operations. More specifically, this disclosure is related to a system that provides long-term resource provisioning for a data center.

Modern virtualization technologies have made it is possible for data centers to run different jobs in a shared environment. In other words, the different jobs can share the same physical resources, such as memory, central processing unit (CPU), and bandwidth, all of which can be provided by a single machine or a cluster of machines. One important consideration for data center operations is to consolidate multiple jobs (or loads) on a single machine or a cluster of machines.

Effective provisioning of the resources involves finding groups of jobs that can consolidate well, i.e., groups that can more effectively utilize the physical resources on a machine or a cluster of machines. A better consolidation can result in increased data center capacity. Moreover, by powering-off unused machines, the data center can also increase its energy savings.

SUMMARY

One embodiment of the present invention provides a system for provisioning physical resources shared by a plurality of jobs. During operation, the system establishes resource-usage models for the jobs, ranks the jobs based on quality of service (QoS) requirements associated with the jobs, and provisions the jobs for a predetermined time interval in such a way that any unused reservations associated with a first subset of jobs having higher QoS rankings are distributed to other remaining jobs with preference given to a second subset of jobs having a highest QoS ranking among the other remaining jobs. Provisioning the jobs involves making reservations for the jobs based on the resource-usage model and corresponding QoS requirements associated with the jobs.

In a variation on this embodiment, provisioning the jobs further involves assigning different numbers of shares to the jobs based on corresponding QoS rankings associated with the jobs, and assigning reservations based on an assumption that unused reservations associated with the first subset of jobs will be proportionally distributed to the other remaining jobs according to the number of shares assigned to the other remaining jobs. The number of shares assigned to a respective job is correlated to the respective job's QoS ranking In a variation on this embodiment, provisioning the jobs further involves sorting the jobs in descending order based on QoS rankings; and iteratively, starting from a job having a highest QoS ranking, forming a subgroup by adding a next-in-line job to a previously formed subgroup, establishing a resource-usage model for the subgroup, and determining a required amount of resources needed by the subgroup based on the resource-usage model for the subgroup and QoS requirement associated with the next-in-line job.

In a further variation, the system makes a reservation for the next-in-line job based on a difference between the required amount of resources and reservations made for the previously formed subgroup.

In a further variation, in response to at least two jobs having a same QoS ranking, the system forms a tiered subgroup by adding the at least two jobs as a tier to the previously formed subgroup, determines a scale factor for each of the at least two jobs based on resources required by each of the at least two jobs, and makes reservations for each of the at least two jobs based on the scale factor.

In a variation on this embodiment, the system provisions the jobs for multiple predetermined time intervals, which involves determining a maximum amount of resources required by a group of one or more jobs over the multiple predetermined time intervals.

In a variation on this embodiment, the system receives an isolation parameter which defines a degree of isolation among jobs. Provisioning the jobs involves applying the isolation parameter while making reservations for the jobs, and a complete isolation results in making individual reservations for the jobs.

BRIEF DESCRIPTION OF THE FIGURES

In the figures, like reference numerals refer to the same figure elements.

DETAILED DESCRIPTION

Figure 1:
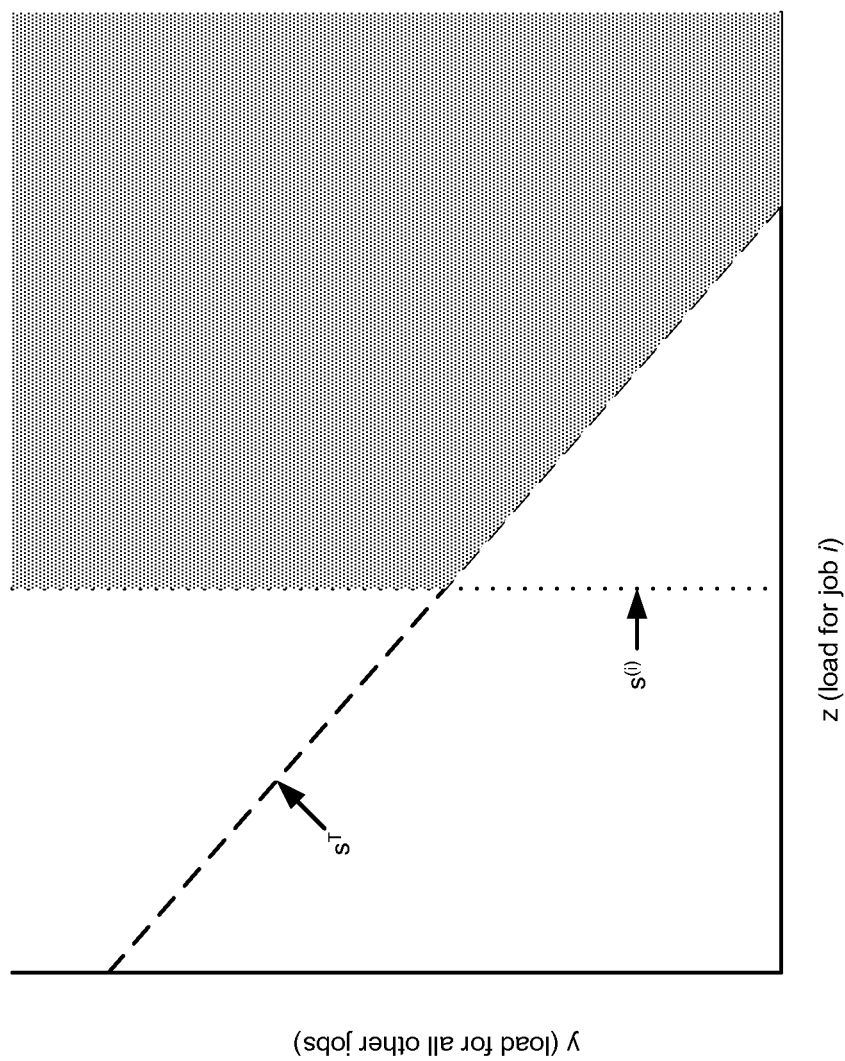
FIG. 1 presents a diagram illustrating an exemplary shortfall analysis for a job.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for providing long-term resource provisioning to a data center.

More specifically, the system provisions resources for a group of jobs based on resource needs of the jobs in a set of future time intervals. To satisfy the resource needs for the jobs as well as meeting their quality-of-service (QoS) requirements, the system applies a total pool allocation algorithm that makes individual reservations for jobs based on descending QoS orders until the cumulative reservations made are large enough to meet resource needs of all jobs. A cascaded algorithm is also used to plan the redistribution of unused reservations to other jobs based on their QoS rankings In this disclosure, the term "physical resource" refers to various types of physical equipment needed for finishing a computing job. It can include processing capability, storage space, communication bandwidth, input/output, etc. Moreover, a particular "physical resource" can refer to a single machine, a cluster of machines, or all machines in a data center. Moreover, the terms "physical resource" and "physical machine" are interchangeable.

In this disclosure, the term "job" refers to a computational task in a shared environment. More specifically, a job can be a virtual machine instance or a collection of virtual machine instances.

Single Interval Provisioning

Although a preferred resource-provisioning system for data center operations should be able to automatically and frequently adjust provisioning, close supervision by a human operator to such a system is still desired. For example, it might be desired to have a monitoring tool that monitors the resource needs of the jobs and suggests resource provisioning. A human operator can then approve and implement the provisioning. An automatic system might adjust provisioning every 15 minutes, while a supervised system might adjust much less frequently (e.g., daily, weekly or even monthly).

Provisioning of resources in a single time interval is very similar to short-term provisioning. The only difference is that the short-term system uses models predicting resource-usage requirements of a group of jobs for an immediately following time interval (such as the next 15 minutes) to allocate resources to meet the resource-usage requirements according to QoS specifications of those jobs; single interval provisioning, on the other hand, involves the provision of resources for a particular time interval that may not be immediately following. Short-term provisioning is relatively easier because recent resource consumption is a strong predictor of near-term resource needs.

In this disclosure, the QoS specification (or the QoS level) for a job is denoted as p, which is the acceptable probability that the job will not be fully provisioned with its resource needs. In other words, a job with QoS level p will not receive all requested resources with a probability p, during a measured interval. Note that QoS level p should not be confused with a job failure probability. Most modern applications are written well enough that they can perform adequately well even when they do not have 100% of requested resources. For example, an application under heavy load might temporarily deliver lower resolution images, or an application running in batch mode might start early to ensure completion by a deadline. However, resilience to resource shortfall is an application-specific characteristic. To avoid confusion, the failure to fully provision is also referred to as a "shortfall" situation. Note that the appropriate setting of the QoS p (i.e., the allowed "probability of shortfall") will be greater than the allowed probability of failure for the job.

In this disclosure, we use a random variable $Z_\tau^{(i)}$ to represent the resources required by job i in time interval $\tau$. Note that Z can be a one-dimensional resource, such as CPU cycles, memory, hard disk, or I/O; or a multi-dimensional resource. When only a single time interval is considered, we can temporarily omit the $\tau$ index.

The resource needs for job i can be modeled by an observed probability distribution function $\phi^{(i)}(z)$ for the random variable $Z^{(i)}$. The corresponding cumulative distribution can be expressed as:

$$\Phi^{(i)}(y) = \int_{-inf}^{y} \phi^{(i)}(z). \qquad (1)$$

Note that the difference between observed distributions and true distributions can be ignored with enough samples. However, when the modeling and consolidation algorithms are newly applied to a set of jobs, some care must be taken to use prior assumptions and incorporate the risk of modeling errors.

The total pool algorithm (also sometimes called the statistical packing algorithm) processes the jobs in decreasing QoS order (or increasing p) by making individual reservations for jobs according to:

$$r^{(i)} = \text{inverse } \Phi^{(i)}(1-p^{(i)}), \qquad (2)$$

until the cumulative reservations $$\hat{r}^{(k)} = \sum_{i=1}^{k} r^{(i)}$$

are large enough that the whole pool of jobs has enough resources. The remaining jobs (with indexes larger than k) require no reservation. In other words, once jobs with higher QoS levels are individually provisioned with enough resources to meet their QoS requirements, the frequent availability of unused resources will be adequate to meet the QoS requirements of jobs with lower QoS levels.

More formally speaking, the total pool allocation algorithm works by finding the smallest index k such that the partial sum of the individual reservations for the first k−1 jobs, $\hat{r}^{(k-1)}$, plus a partial reservation $s^{(k)} \le r^{(k)}$ at job k, is large enough to meet the entire groups' resource needs at the $k_{th}$ job's QoS level (i.e., $p^{(k)}$). That is, $$\hat{r}^{(k-1)} + s^{(k)} = \text{inverse } \Psi^{(n)}(1-p^{(k)}). \qquad (3)$$

Note the (n) superscript on $\Psi$, meaning the cumulative distribution is for the entire group. According to Eq. (3), jobs 1, 2, . . . , k can obtain reservations $r^{(1)}, r^{(2)}, \ldots, r^{(k-1)}, s^{(k)}$, and no reservation is given to the remaining jobs. Note that, because the jobs are in QoS order, QoS requirements of the remaining jobs can be met even without further reservations. The actual reservation given to a job i depends on where the job stands with respect to the transitional index k:

$$\tilde{r}^{(i)} = \begin{cases} r^{(i)}, & i < k \\ s^{(k)}, & i = k \\ 0, & i > k \end{cases} \qquad (4)$$

It is more convenient to express Eq. (4) using its algorithmic version:

$\quad accum \leftarrow 0$ $\quad \text{for } i = 1 \text{ to } n$ $\qquad \tilde{r}^{(i)} \leftarrow \max(0, \min(r^{(i)}, \text{inverse}\Psi^{(n)}(1-p^{(k)}) - accum))$, $\qquad accum \leftarrow accum + \tilde{r}^{(i)}$ $\quad \text{end}$ where the variable "accum" is the total reservation made. The correctness of Eq. (4) (and its algorithmic version) follows from the observation that meeting the group's resource needs according to Eq. (3) will meet all individual jobs' resource needs at a QoS level of $p^{(k)}$, which is more than adequate for any subsequent job with index j>k, where $p^{(j)} \geq p^{(k)}$.

Application of the total pool algorithm requires modeling of resource needs for individual jobs (Eq. (2)), as well as modeling of the resource needs for the entire group (Eq. (3)). So far we have described a total pool allocation algorithm that proceeds sequentially through the jobs in QoS order and results in the reservations shown in Eq. (4), with large protective reservations for jobs with indices less than k and no reservations for jobs with indices greater than k. It is possible to improve this result slightly, reducing the total reservation by computing all the reservations at once using a so-called fixed-point calculation. In most cases, the result of the fixed-point calculation resembles the reservations of Eq. (4), but softens the transition at k, reserving less for jobs with indices less than k and making small reservations for jobs with indices greater than k.

Assuming that, for each job i, we can model the joint distribution of the resource needs of the job (random variable $Z^{(i)}$) and the total resource needs of all other jobs excluding job i (random variable $Y^{(-i)}$), which is denoted as the observed probability distribution function $\xi^{(i)}(y, z)$, then the shortfall probability can be calculated as:

$$q^{(i)}(s^{(i)}, s^T) = \int_{(y,z) \in \{(z > s^{(i)}) \wedge (y+z > s^T)\}} \xi^{(i)}(y,z) dz, \quad (5)$$

where $s^{(i)}$ is the individual reservation made for job i, and $s^T = s^{(1)} + s^{(2)} + \ldots + s^{(n)}$ is the reservation made for the entire group. A shortfall occurs when neither the individual reservation nor the group reservation is large enough: $(z > s^{(i)}) \wedge (y+z > s^T)$.

FIG. 1 presents a diagram illustrating an exemplary shortfall analysis for a job. The x-axis is the resource needs of job i (variable z), and the y-axis is the resource needs of all other jobs (variable y). The dotted line stands for the individual reservation made for job i ($s^{(i)}$); the dashed line stands for the reservation made for the entire group ($s^T$). When the resource needs for job i are smaller than the individual reservation made for job i (i.e., on the left side of the dotted line), such needs can be satisfied by the individual reservation for job i. When the resource needs for job i are greater than its individual reservation (i.e., on the right side of the dotted line), but the resource needs for the group are less than the group reservation (i.e., below the dashed line), resource needs for job i can be satisfied by the unused reservations of other jobs. The shaded area (to the right of the dotted line and above the dashed line) is the so-called shortfall region. Shortfall occurs when resource needs fall within the shortfall region. Note that, if the group reservation is not large enough, then depending on how the virtual machine scheduler works, some jobs may still be fully provisioned. Here we assume that the "pain will be shared," all jobs within the group will be short of their full resource needs, and that even a slight shortfall will count as a failure event for purposes of QoS requirements. This is a conservative approach to meeting QoS requirements, that is, unless they are guaranteed by the individual or group reservations, we will not assume they are met.

Using the shortfall probability, one can determine the required individual reservation $s^{(i)}$ as a simultaneous solution of:

$$q^{(i)}(s^{(i)}, s^T) = p^{(i)}, \quad (6)$$

and $$s^T = \sum_{i=1}^{n} s^{(i)}. \quad (7)$$

Eqs. (6) and (7) can be solved using a fixed-point computation: starting with a total reservation $s^T$, solve for the individual reservations $s^{(i)}$ necessary to meet the QoS requirements according to Eq. (6); then use these individual reservations to define a new total reservation according to Eq. (7). If the observed probability distribution functions are provided as histograms, this fixed-point computation can proceed systematically: search for the correct $s^T$ by starting with the largest possible value, and reducing $s^T$ stepwise. This will result in $s^{(i)}$ in the solution of Eq. (6) increasing monotonically. The search stops when the sum of the $s^{(i)}$ exceeds $s^T$, thus identifying the fixed point to within the accuracy of the quantization of the histogram. To complete the algorithm, $s^T$ is set to the sum of the $s^{(i)}$ according to Eq. (7), thus ensuring that both the $s^{(i)}$ and $s^T$ are equal to or larger than necessary.

The correctness of this algorithm follows from Eq. (6). At the fixed point, the probability of a shortfall will be the probability $p^{(i)}$ required by the QoS specification. Note that, when histograms and stepwise searches are used, there may be some overshoot. However, the fact that $q^{(i)}(s^{(i)}, s^T)$ monotonically decreases as $s^{(i)}$ and $s^T$ both increase can result in:

$$q^{(i)}(s^{(i)}, s^T) \leq p^{(i)}, \quad (8)$$

which meets or exceeds the QoS requirement for job i.

Although this fixed-point variation of the total pool allocation algorithm can be viewed as the optimal solution to the provisioning problem, assuming that the only control of the provisioning is to make individual job reservations, other tools can also be used to control provisioning, including a solution that selectively redistributes unused reservations.

The aforementioned total pool allocation algorithm allows unused reservations to be redistributed evenly among all jobs in the pool. However, it is beneficial to selectively redistribute those unused reservations by favoring jobs with higher QoS ratings (i.e., jobs with lower p). In one embodiment, a "share" machinery is used when redistributing the unused reservations. More specifically, each job is assigned with a number of shares, and the unused reservations are distributed proportionally to the shares of the remaining jobs needing resources. Hence, by assigning higher QoS jobs with more shares, one can ensure that those jobs can obtain more unused reservations. For example, when jobs are indexed in decreasing QoS order, the system can assign shares based on the index: job i receives $M^{n-i}$ shares, where M is a large positive constant and n is the number of jobs in the pool. The larger the M, the more the redistribution favors higher QoS jobs. In the limit $M \to \infty$, all unused resources will "cascade" through the remaining jobs in QoS order, until all jobs' resource needs are met (or there aren't enough resources). In practice, M is set at a finite value, such as 5 or 10. At these finite values, some of the unused resources will "leak" to lower QoS jobs. With the total pool allocation algorithm, these resources are not wasted because giving unused resources to lower QoS jobs also helps with consolidation.

In an alternative embodiment, instead of assigning shares to jobs, or virtual machines, the system uses a grouping machinery to create a similar cascading of unused resources to jobs based on their QoS rankings More specifically, the two jobs (or virtual machines) with the highest QoS rankings are grouped together, and then a hierarchy of groups is built by adding lower QoS jobs successively as the hierarchy is extended, as shown:

$$\{\{\{\{vm_1, vm_2\}, vm_3\}, vm_4\} \ldots, vm_n\}. \quad (9)$$

The individual jobs (or virtual machines) are given reservation $\tilde{r}^{(i)}$, and the total resource pool $\tilde{r}^T$ is chosen to be larger than the sum of the individual reservations, given as:

$$\tilde{r}^T \geq \sum_{i=1}^{n} \tilde{r}^{(i)}. \quad (10)$$

Note that $\tilde{r}^T$ is set with some extra padding to allow bin-packing across multiple physical machines and for rounding to an integral number of machines. Each group is given a large reservation equal to the total resources in the pool minus any reservations not in its subtree:

$$\tilde{g}^{(i)} = \tilde{r}^T - \sum_{j=i+1}^{n} \tilde{r}^{(j)}, \quad (11)$$

where $\tilde{g}^{(i)}$ is the reservation for the group formed in the hierarchy containing $vm_1, vm_2, \ldots, vm_i$ in its subtree. These group reservations capture unused resources in their subtree until all needs are met. This way the unused resources will favor the left side of the group hierarchy, meeting the resource needs of higher QoS jobs before meeting the resource needs of the lower QoS jobs.

One practical consideration is that QoS specifications are likely to fall into a small number of fixed levels. Hence, not every job will have a distinct QoS level $p^{(i)}$. Rather than cascading unused resources through the jobs sequentially, the unused resources can cascade simultaneously to all jobs with the same QoS level. This can be arranged by making the share assignment equal for equal QoS jobs, or if the grouping mechanism is used, adding equal QoS jobs together at the same level in the hierarchy.

For simplicity, we first consider a case of distinct QoS levels and strictly ordered cascading (i.e., M→∞, or a hierarchy of groups with one new virtual machine added at each level). The cascading excess algorithm processes the jobs in descending QoS order (thus ascending $p^{(i)}$) with the highest QoS job first. At each step, an actual reservation $\tilde{r}^{(i)}$ is chosen so that the cumulative reservation will meet the resource needs of job i grouped with all the preceding jobs. For each i, let $\bar{r}^{(i)}$ be the total reservation required for the prefix group $\{1, 2, \ldots, i\}$ at the QoS level of the last job in the group:

$$\bar{r}^{(i)} = \text{inverse } \Psi^{(i)}(1 - p^{(i)}), \quad (12)$$

where $\Psi^{(i)}$ is the cumulative distribution function (CDF) for the prefix group. The actual reservation $\tilde{r}^{(i)}$ for job i is the additional reservation necessary for job i (beyond the sum of reservations already made for the higher QoS jobs, $\tilde{r}^{(1)} + \tilde{r}^{(2)} + \ldots + \tilde{r}^{(i-1)}$) to meet the total requirement for the prefix group $\{1, 2, \ldots, i\}$. The algorithm for calculating $\tilde{r}^{(i)}$ can can be written as:

$$accum \leftarrow 0$$

for $i = 1$ to $n$

-continued $$\tilde{r}^{(i)} \leftarrow \max(0, \bar{r}^{(i)} - accum)$$

$$accum \leftarrow accum + \tilde{r}^{(i)}$$

end

Figure 2:
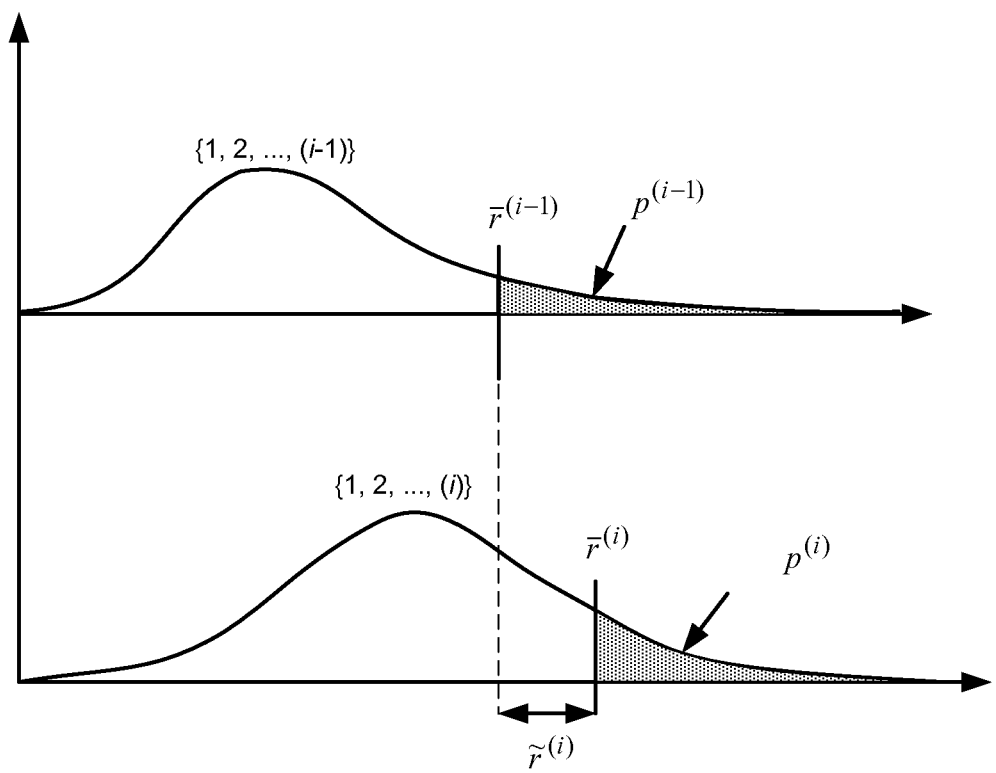
FIG. 2 presents a diagram illustrating how resources cascade between two adjacent prefix groups, in accordance with an embodiment of the present invention.

Notice that the benefit derived from using the share (or grouping) machinery to cascade unused resources through the remaining jobs in descending QoS order is that a lower QoS job needing more than its predicted resources (for example, beyond what is necessary to meet its QoS needs) will not receive unused resources until these resources have cascaded through higher QoS jobs. FIG. 2 presents a diagram illustrating how resources cascade between two adjacent prefix groups, in accordance with an embodiment of the present invention. The top half of FIG. 2 shows the probability density function (PDF) for the prefix group $\{1, 2, \ldots, i-1\}$; and the bottom half of FIG. 2 shows the PDF for the next prefix group $\{1, 2, \ldots, i\}$. Note that for descending QoS order, shortfall probability $p^{(i)}$ increases with i, thus leading to required reservation for the prefix group shift to the left relative to the distribution. One can see from FIG. 2 that little additional reservation $\tilde{r}^{(i)}$ is needed. The correctness of this cascading-excess algorithm is provided by knowing that $$\sum_{j=1}^{i} \tilde{r}^{(j)} \geq \bar{r}^{(i)}$$

and by Eq. (12). The cumulative reservations made based on the cascading-excess algorithm are large enough to meet the resource needs of group $\{1, 2, \ldots, i\}$ at QoS level $p^{(i)}$ and will necessarily meet the resource needs for job i, the last member of the group, at QoS level $p^{(i)}$.

In cases where multiple jobs have the same QoS requirement, a tier-based cascading-excess algorithm can be implemented. More specifically, the unused reservations cascade to all jobs in the same tier, or jobs with the same QoS level, at the same time. To do so, jobs in a given tier are given an equal number of shares. Hence, when these jobs are given their reservations, they will receive equal portions of the extra available resources.

The tier-based cascade algorithm defines m QoS tiers, such that each (QoS-ordered) job i is assigned to a tier, and such that each job in a given tier shares the same QoS level. Tier k of a job i can be defined by the grouping mechanism as k=G(i), and the number of jobs in tier k is denoted as $m_k$. Assuming the tiers are indexed in descending QoS order, the reservation required for a prefix group that includes all jobs i such that G(i)≤k is:

$$\bar{r}_g^{(k)} = \text{inverse } \Psi_g^{(k)}(1 - p_g^{(k)}), \quad (13)$$

where $\Psi_g^{(k)}$ is the CDF for the prefix group, and $p_g^{(k)}$ is the shortfall probability associated with QoS tier k.

Because the share mechanism allocates extra resources at each tier equally among the jobs in the tier, the remaining reservation required, $\tilde{r}_g^{(k)}$, can be heuristically allocated proportionally to each job's individual provisioning reservation $r^{*(i)}$. In one embodiment, the system makes actual reservations for each job based on the scaled individual reservation for the job. The scaled individual reservation for job i is defined as:

$$\gamma^{(i)} = \frac{r_*^{(i)}}{\sum_{G(j)=G(i)} r_*^{(j)}}. \quad (14)$$

Accordingly, the actual reservation for job i is given by:

$accum \leftarrow 0$ $i \leftarrow 1$ for $k = 1$ to $m$ $acctier \leftarrow 0$ while $i \leq n$ and $G(i) == k$ $\tilde{r}^{(i)} \leftarrow \max(0, \gamma^{(i)}(\tilde{r}_g^{(k)} - accum))$ $i \leftarrow i + 1$ $acctier \leftarrow acctier + \tilde{r}^{(i)}$ end $accum \leftarrow accum + acctier$ end Note that other than the scale individual reservation defined by Eq. (14), other definitions of this proportioning factor are also possible, as long as all the $\gamma^{(i)}$ values for a given tier sum to 1. This particular heuristic, that apportions the tier reservations proportionally to the individual provisioning reservation, has the advantage of offering individual protection as well as guiding migration decisions sensibly. The correctness of this tier-based cascading-excess algorithm is provided by knowing that: for each k, $$\sum_{G(i)=k} \gamma^{(i)} = 1 \text{ and } \sum_{G(i)=k} \tilde{r}^{(i)} = \max\left(0, \tilde{r}_g^{(k)} - \sum_{G(i)<k} \tilde{r}^{(i)}\right).$$

Therefore, $$\sum_{G(i)\leq k} \tilde{r}^{(i)} \geq \tilde{r}_g^{(k)}.$$

Hence, according to Eq. (13), the cumulative reservation is large enough to meet the needs of the tier prefix group $\Psi_k^{(g)}$ at at QoS level $p^{(k)}$.

In general, there is a tradeoff between the modeling effort and the amount of consolidation achieved. The simple total pool allocation algorithm has the simplest modeling requirements, which models individual job resources and the total resources. The fixed-point variation of the total pool allocation algorithm obtains a better, more consolidated solution, but requires joint models for each job. The cascading-excess algorithm obtains a better, more consolidated solution by using more provisioning machinery in the underlying virtualization scheduler (i.e., either "shares" or grouping), but its modeling needs are slightly more complicated than the simple total pool allocation, requiring models of n "prefix groups," rather than n individual models. The tier-based cascading-excess algorithm, as an extension of the cascading-excess algorithm, also obtains an improved consolidated solution, but requires models of the m tier prefix groups, as well as the n individual models (for calculating γ).

If the jobs are independent, then the different modeling requirements are not significant, all the above models can be derived by various convolutions of the individual job models. However, in practice, the jobs' resource needs are usually correlated, and modeling that accounts for this correlation (i.e., modeling various group resource requirements) is essential to solving the consolidation problem well. The cascading-excess algorithm also provides the benefit of more isolation of the high QoS jobs from the low QoS jobs.

Multiple Interval Provisioning

Long-term provisioning of a data center involves provisioning for multiple time intervals. Rather than dynamically changing provisioning before each time interval, it is preferable to set one provisioning in advance that will work well for multiple time intervals (e.g., an entire day, or an entire week). The motivation for this more stable provisioning is that it allows data center operators to more carefully supervise operations of the data center, for example, by less frequently reviewing and/or manually applying a longer-term provisioning recommendation.

The challenge for multiple interval provisioning is computing a provisioning that works simultaneously for multiple intervals. A simple strategy might be to use any one of the above-described single interval provisioning algorithms to compute reservations $r_\tau^{(i)}$ for each time interval τ, and then use the maximum across all such reservations by setting:

$$\tilde{r}_*^{(i)} = \max_\tau \tilde{r}_\tau^{(i)}. \quad (15)$$

While this might work well for some sets of jobs, it has the disadvantage that, if the resource needs of jobs are complementary, they likely will not all need their maximum in the same time interval. Hence, even though the single interval provisioning algorithms do a good job of sharing resources within a single time interval, the max operation in Eq. (15) does not do a good job of sharing resources among time intervals. A better approach is needed.

Among the various single interval provisioning algorithms, the cascading-excess approach provides the most control for reallocating resources among time intervals. Here, we can extend the cascading-excess algorithm to multiple time intervals. For each prefix group $\{1, 2, \ldots, i\}$, the required reservation $\bar{r}*^{(i)}$ to meet the resource needs of the group at the QoS level of the last member of the group (i.e., $p^{(i)}$) for all time intervals can be computed using:

$$\bar{r}_\tau^{(i)} = \text{inverse } \Psi_\tau^{(i)}(1 - p^{(i)}), \text{ and} \quad (16)$$

$$\bar{r}_*^{(i)} = \max_\tau \bar{r}_\tau^{(i)}. \quad (17)$$

Using the aforementioned share or grouping machineries, and assuming that the excess resources will cascade to the job in descending QoS order, the actual reservations can be computed using the following algorithm:

$accum \leftarrow 0$ for $i = 1$ to $n$

-continued $$\tilde{r}_*^{(i)} \leftarrow \max(0, \bar{r}_*^{(i)} - accum)$$

$$accum \leftarrow accum + \tilde{r}_*^{(i)}$$

end.

This algorithm differs from the simple max algorithm described by Eq. (15). Rather than applying the max to the actual single interval reservation $\tilde{r}_\tau^{(i)}$, this algorithm applies the max to the required reservation before making the actual reservation, as shown in Eq. (17). This way allows more sharing of resources within the prefix groups.

The correctness of this algorithm is provided by noticing that, for each prefix group $\{1, 2, \ldots, i\}$, there will be enough cumulative reservation as $$\sum_{j=1}^{i} \tilde{r}_*^{(j)} \geq \bar{r}_*^{(i)}.$$

According to Eq. (17), the cumulative reservation $\bar{r}^{*(i)}$ is large enough to meet the resource needs of the prefix group at the QoS level of the last member of the group, job i, in every time interval. Hence, the provisioning for prefix group i ensures that job i will meet its QoS requirements.

For the tiered cases, Eqs. (16) and (17) can be rewritten as:

$$\bar{r}_{g\tau}^{(i)} = \text{inverse } \Psi_{g\tau}^{(i)}(1 - p_g^{(i)}), \text{ and} \quad (18)$$

$$\bar{r}_{g*}^{(i)} = \max_\tau \bar{r}_{g\tau}^{(i)}, \quad (19)$$

where $\bar{r}_{g*}^{(i)}$ is the required reservation to meet the resource needs of the group at the QoS level of the last tier of the group (i.e., $p_g^{(i)}$) for all time intervals.

The scaled individual reservation for job i can be calculated as an average of the fraction over all time intervals according to:

$$\gamma_\tau^{(i)} = \frac{r_{*\tau}^{(i)}}{\sum_{G(j)=G(i)} r_{*\tau}^{(j)}}, \text{ and} \quad (20)$$

$$\gamma^{(i)} = \frac{1}{T}\sum_\tau \gamma_\tau^{(i)}, \quad (21)$$

there T is the number of time points.

The algorithm is similar to the single interval tier-based cascading-excess algorithm:

$$accum \leftarrow 0$$
$$i \leftarrow 1$$
for $k = 1$ to $m$
$$acctier \leftarrow 0$$
while $i \leq n$ and $G(i) == k$
$$\tilde{r}^{(i)} \leftarrow \max(0, \gamma^{(i)}(\bar{r}_g^{(k)} - accum))$$
$$i \leftarrow i + 1$$

-continued $$acctier \leftarrow acctier + \tilde{r}^{(i)}$$

end $$accum \leftarrow accum + acctier$$

end

Because, for each k, $$\sum_{G(i)=k} \gamma^{(i)} = 1,$$

logic that proves the correctness of the single interval scenario also holds for this multiple interval tier-based cascading-excess algorithm.

Isolation Between Job Models

One of the benefits of virtualization is to allow virtual machines to share resources; yet another benefit, less often cited, is to isolate virtual machines from each other. It is challenging to achieve both these benefits because sharing resources often means that complete isolation is not possible or desirable. In practice, it is desirable to have enough isolation that rogue behavior of one job does not seriously impact the other jobs in the system.

A simple step to improve isolation is to use the "maximum" specifications presented in virtualization systems, such as VMware® (registered trademark of VMware, Inc. of Palo Alto, Calif.). For example, if an individual reservation for job i requires a reservation:

$$r_*^{(i)} = \max_\tau \text{ inverse } \Phi_\tau^{(i)}(1 - p^{(i)}), \quad (22)$$

then a maximum could be set according to:

$$m_*^{(i)} = \max_\tau \text{ inverse } \Phi_\tau^{(i)}(1 - p^{(i)}/2). \quad (23)$$

In other words, job i is not allowed to use more resources than necessary to outperform its QoS requirement by a certain constant factor, in this case 2. Another simple approach to specifying the maxima is to use a multiplicative factor greater than 1, such as 1.2, applied to $r^{*(i)}$, but the availability of $\Phi^{(i)}$ makes Eq. (23) a more principled approach to setting the maxima. Note that the maxima set in Eq. (23) can be set even when different group consolidation algorithms, described in the preceding section, are being used to set the minima (i.e., the reservations). While setting maxima is helpful, when group consolidation algorithms are used, additional technology is also needed to provide better control of job isolations.

When jobs are first virtualized, a conservative strategy is to reserve amounts of virtual resources equivalent to the previously employed physical resources. Although this does not completely isolate the jobs from each other (they still share and benefit from unused resources), they do at least as well as their previously non-virtualized physical implementations. Unfortunately, this conservative approach of simply reserving virtual resources equivalent to the previously employed physical resources does not realize the full benefits of virtualization. Once the resource needs of jobs are well modeled, and the QoS requirements are well specified, considerable additional savings in resources and improvement in QoS are possible through isolation reduction and resource sharing. This can be achieved through any of the aforementioned algorithms.

It is important to emphasize that jobs with highly variable resource needs are not a problem for the aforementioned resource consolidation algorithms, and do not need to be isolated, as long as their variability is adequately well modeled. When jobs are first virtualized, it is useful to manage the degree of isolation, starting with high isolation, and then as the jobs' resource needs are better modeled, reducing the isolation and achieving greater consolidation.

Here we introduce a parameter a that controls the isolation of jobs. $\alpha$ ranges between 0 and 1, with 0 meaning full isolation and 1 meaning full sharing of resources among jobs. For cases where jobs have distinct QoS levels, Eq. (22) defines an individual reservation, and the required reservation $\tilde{r}^{*(i)}$ for a prefix group $\{1, 2, \ldots, i\}$ to meet the resource needs of the group at the QoS level of the last member of the group (i.e., $p^{(i)}$) is (according to Eqs. (16)-(17)):

$$\tilde{r}_*^{(i)} = \max_\tau \text{ inverse } \Psi_\tau^{(i)}(1 - p^{(i)}). \quad (24)$$

Assuming the jobs are sorted in descending QoS order and using Eqs. (22) and (24), we can set their allocation according to:

$$accum \leftarrow 0$$
$$\text{for } i = 1 \text{ to } n$$
$$\quad \tilde{r}_*^{(i)} \leftarrow (1 - \alpha) r_*^{(i)} + \alpha \max(0, \tilde{r}_*^{(i)} - accum)$$
$$\quad accum \leftarrow accum + \tilde{r}_*^{(i)}$$
$$end$$

As one can see, at one extreme ($\alpha$=0), the above algorithm is reduced to the individual provisioning ($\tilde{r}^{*(i)}=r^{*(i)}$) defined by Eq. (22); at the other extreme ($\alpha$=1), the above algorithm is reduced to the multiple interval cascading-excess algorithm described in the previous section.

For cases where jobs may have the same QoS levels (the tier-based cases), the required reservation for a tier "prefix group" that can meet the QoS requirement of the last tier member is (according to Eqs. (18)-(19)):

$$\tilde{r}_{g*}^{(i)} = \max_\tau \text{ inverse } \Psi_{g\tau}^{(i)}(1 - p_g^{(i)}). \quad (25)$$

Using the same $\alpha$ parameter, one can set the allocations according to:

$$accum \leftarrow 0$$
$$i \leftarrow 1$$
$$\text{for } k = 1 \text{ to } m$$
$$\quad acctier \leftarrow 0$$
$$\quad \text{while } i \leq n \text{ and } G(i) == k$$
$$\quad\quad \tilde{r}^{(i)} \leftarrow (1 - \alpha) r_*^{(i)} + \alpha \max\left(0, \gamma^{(i)}\left(\tilde{r}_{g*}^{(k)} - accum\right)\right)$$
$$\quad\quad i \leftarrow i + 1$$
$$\quad\quad acctier \leftarrow acctier + \tilde{r}^{(i)}$$
$$\quad end$$
$$\quad accum \leftarrow accum + acctier$$
$$end$$

Similarly to the previous algorithm, this tier-based algorithm is reduced to individual provisioning at $\alpha$=0, and to the multiple interval tier-based cascading-excess algorithm described in the previous section at $\alpha$=1.

Embodiments of the present invention provide a solution for long-term resource provisioning in data centers. More specifically, the system applies multiple interval algorithms (cascading-excess and tier-based cascading-excess) to models for future resource needs over multiple time intervals, such as multiple time periods over a day, or multiple days over a week, thus enabling less frequent changes in provisioning. Hence, the system provides human operators an opportunity to supervise resource provisioning. For example, a human operator can receive recommendations from a monitoring tool, which monitors the resource usage of the jobs, and can then manually apply the recommendations. Moreover, it is possible for the system to manage the degree of isolation among jobs. Particularly, the system can transition between a nearly complete isolation mode and a resource-sharing mode that enables highly efficient group consolidation. For example, when jobs are newly introduced and their resource needs are poorly understood, the system can operate in the complete isolation mode where jobs receive individual reservations that can meet their QoS needs. After the jobs are better modeled and the potential sharing of resources can be analyzed and implemented, the system can operate in the sharing mode where reservations are made to the group (based on the total pool allocation algorithm and its variations) to enable efficient group consolidation.

System and Modules

Figure 3:
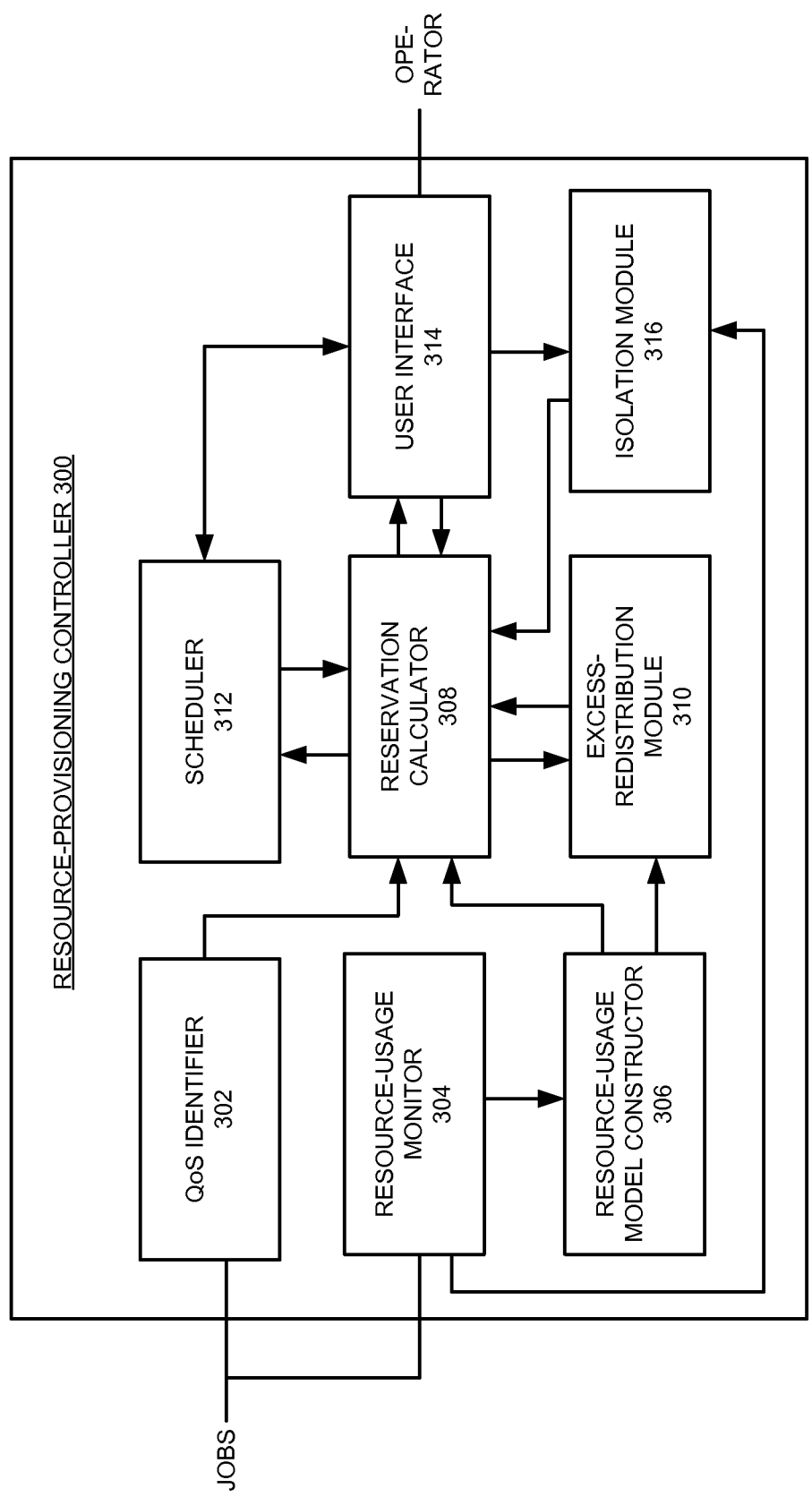
FIG. 3 presents a diagram illustrating a resource-provisioning controller, in accordance with an embodiment of the present invention.

FIG. 3 presents a diagram illustrating a resource-provisioning controller, in accordance with an embodiment of the present invention. In FIG. 3, resource-provisioning controller 300 includes a QoS identifier 302, a resource-usage monitor 304, a resource-usage model constructor 306, a reservation calculator 308, an excess-redistribution module 310, a scheduler 312, and a user interface 314.

Resource-provisioning controller 300 controls the resource provisioning of jobs located on a physical machine or a cluster of machines in order to achieve the best performance. QoS identifier 302 identifies the QoS requirements associated with each job. In one embodiment, the QoS requirement is expressed by a shortfall probability. Resource-usage monitor 304 monitors the resource needs for each job, which can be totally random or have a certain temporal pattern. Resource-usage model constructor 306 receives usage information from resource-usage monitor 304 and constructs a resource-usage model for each job accordingly. In some embodiments, resource-usage model constructor 306 computes models for prefix groups of jobs. In one embodiment, the resource-usage model includes a resource-needs distribution function, which indicates the probability of a job or group of jobs needing a certain amount of resources. In a further embodiment, the resource-usage model includes a temporal distribution of the resource needs of a job or group of jobs. For example, the probability for certain jobs to need a large amount of resources in the morning may be high.

Based on the constructed resource-usage model and the QoS requirement for each job, reservation calculator 308 computes the required reservation for each job. In one embodiment, a total pool allocation algorithm is used to compute the required reservation. More specifically, reservation calculator 308 first indexes the jobs in descending QoS order, and then finds the smallest index k such that the partial sum of the individual reservations for the first k−1 jobs plus a partial reservation for job k is large enough to meet the entire group's resource needs at the $k_{th}$ job's QoS level. In other words, reservation calculator 308 outputs reservations for the first k−1 jobs as their individual reservations required to meet their QoS requirements, a reservation for the $k_{th}$ job as a fraction of its individual reservation required to meet its QoS requirement, and zero reservations for the remaining lower QoS jobs. In one embodiment, reservation calculator 308 computes the reservations using a fixed-point variation of the total pool allocation algorithm. Note that in order to implement the fixed-point variation, resource-usage model constructor 306 needs to construct joint models for jobs that describe resource needs for a job and the remainder of the group.

Excess-redistribution module 310 controls how the unused reservations are redistributed among jobs. In one embodiment, excess-redistribution module 310 uses the "share" machinery that assigns shares to jobs based on their QoS requirement, and more shares are given to higher QoS jobs. In this way the operation of a system such as VMware, by distributing unused reservations proportionally to the shares, will cause unused reservations cascade through the remaining jobs in QoS order. In one embodiment, excess-redistribution module 310 uses the "grouping" machinery that builds a hierarchy of groups, each of which is formed by adding a next-in-line lower-ordered QoS job to a previously formed group. The reservation made for the newly added job is the additional reservation necessary for the job (beyond the sum of reservations already made for the higher QoS jobs) that can meet the QoS requirement for the current group. Note that in cases where the unused reservations are distributed evenly among remaining jobs, excess-redistribution module 310 is not invoked.

In one embodiment, outputs of reservation calculator 308 and excess-redistribution module 310 are sent to scheduler 312, which makes the actual reservations for each job. In one embodiment, the outputs are sent to user interface 314, which presents the output to a human operator. The human operator can review the proposed resource provisioning and determine whether to implement such provisioning. User interface 314 also enables the operator to control isolation module 316. More specifically, the operator can set the isolation parameter. Using the isolation parameter, isolation module 316 can manage the degree of isolation among jobs. If the isolation parameter is set as 0, total isolation of jobs is required by isolation module 316. Consequently, reservation calculator 308 computes reservations for jobs based on their individual needs. If the isolation parameter is set as 1, isolation module 316 allows jobs to share resources completely. Consequently, reservation calculator 308 computes reservations for jobs based on their needs as a group. In a further embodiment, instead of a human operator, isolation module 316 determines the isolation parameter based on inputs from resource-usage monitor 304. As the system gradually accumulates knowledge about the resource-usage of the jobs, isolation module 316 increases the isolation parameter.

Resource-provisioning controller 300 can be used to provision resources for a single time interval or multiple time intervals. When used for multiple interval provisioning, resource-usage model constructor 306 needs to construct resource-usage models for the various time intervals, and reservation calculator 308 computes the reservations for jobs that can meet the QoS requirements for all time intervals. Similarly, excess-redistribution module 310 also needs to implement the multiple interval algorithm when redistributing the unused reservations. Provisioning strategy for the multiple intervals can be presented to the operator by user interface 314, and the operator can instruct scheduler 312 to implement the proposed provisioning for the multiple time intervals simultaneously.

Figure 4:
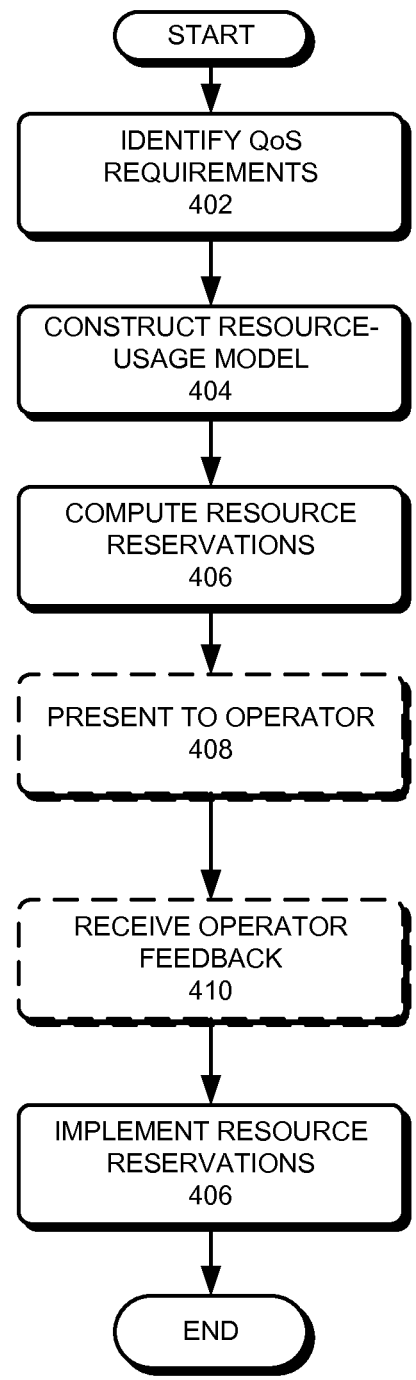
FIG. 4 presents a flowchart illustrating an exemplary process of resource provisioning, in accordance with an embodiment of the present invention.

FIG. 4 presents a flowchart illustrating an exemplary process of resource provisioning, in accordance with an embodiment of the present invention. During operation, the system identifies QoS requirements for each job running on a machine or a cluster of machines (operation 402), and constructs a resource-usage model for each job based on the resource-usage history of the job (operation 404). In one embodiment, the resource-usage model includes a resource-usage probability distribution function, such as a probability density function (PDF). In a further embodiment, the resource-usage-distribution probability function varies with time.

Subsequently, the system computes resource reservations for jobs (operation 406). Depending on the desired level of consolidation, various algorithms can be used to compute the resource reservations, including but not limited to: a simple total pool allocation algorithm, a fixed-point variation of the total pool allocation algorithm, a cascading-excess algorithm, and a tier-based cascading-excess algorithm. In a further embodiment, the system uses an isolation parameter to control the degree of isolation among jobs. Note that the computed resource reservations can be applied to a single time interval or multiple time intervals. For multiple interval cases, the multiple interval variations of the various algorithms are implemented by the system when computing the resource reservations.

The system optionally presents the computed resource reservations to a human operator (operation 408) and receives feedback from the operator (operation 410). Based on the operator's feedback, the system implements the resource reservations for a single time interval or multiple time intervals (operation 412).

Figure 5:
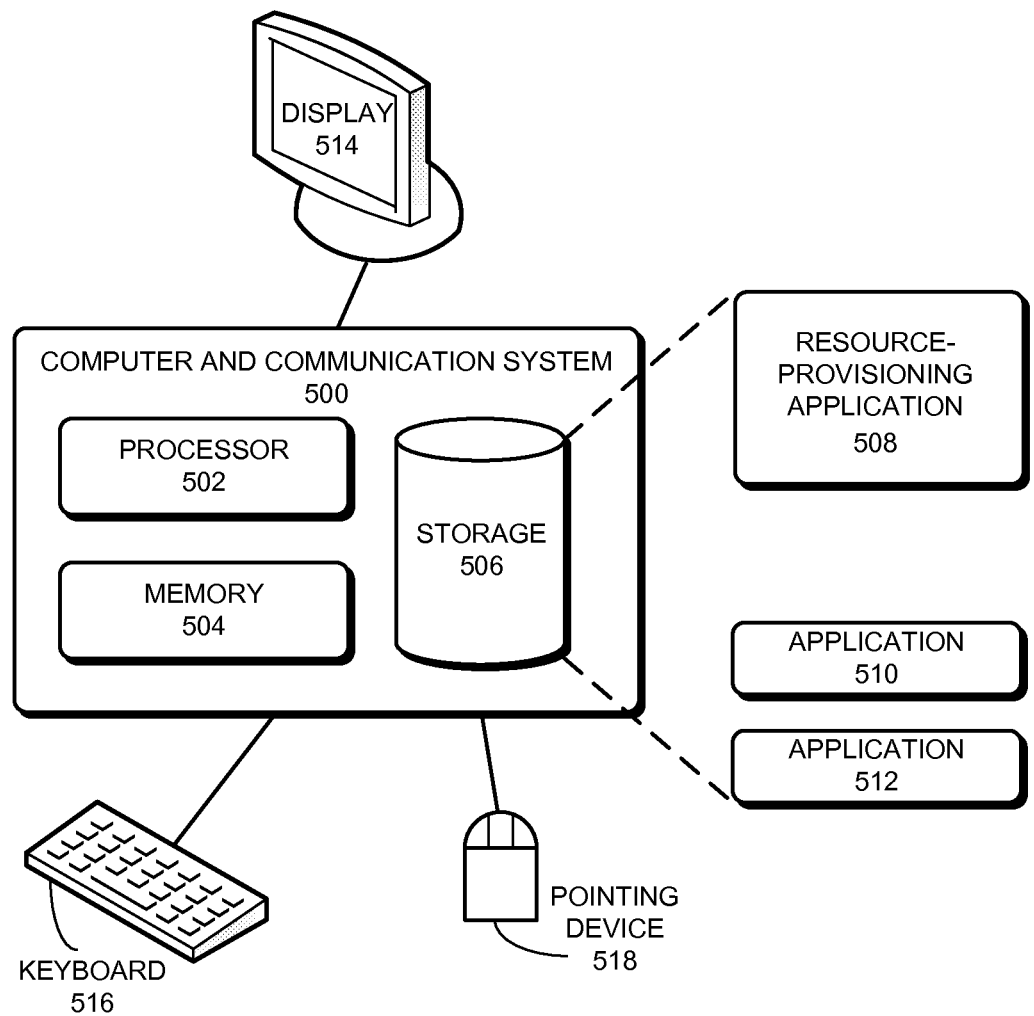
FIG. 5 illustrates an exemplary computer system for resource provisioning in a data center, in accordance with one embodiment of the present invention.

FIG. 5 illustrates an exemplary computer system for resource provisioning in a data center, in accordance with one embodiment of the present invention. In one embodiment, a computer and communication system 500 includes a processor 502, a memory 504, and a storage device 506. Storage device 506 stores a resource-provisioning application 508, as well as other applications, such as applications 510 and 512. During operation, resource-provisioning application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

Note that the considerations of resource provisioning can be applied at multiple levels in the data centers, including a single machine, a cluster of machines, or a data center, where group consolidation can be used to improve the resource utilization while meeting QoS requirements.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for provisioning physical resources shared by a plurality of jobs, comprising:
    establishing resource-usage models for the jobs;
    ranking the jobs based on quality of service (QoS) requirements associated with the jobs; and
    provisioning the jobs for a predetermined time interval in such a way that any unused reservations associated with a first subset of jobs having higher QoS rankings than other remaining jobs are distributed to the other remaining jobs with preference given to a second subset of jobs having a highest QoS ranking among the other remaining jobs, wherein provisioning the jobs involves making reservations for the jobs based on the resource-usage model and corresponding QoS requirements associated with the jobs.

2. The method of claim 1, wherein provisioning the jobs further involves:
    assigning different numbers of shares to the jobs based on corresponding QoS rankings associated with the jobs, wherein the number of shares assigned to a respective job is inversely correlated to the respective job's QoS ranking; and
    assigning reservations based on an assumption that unused reservations associated with the first subset of jobs will be proportionally distributed to the other remaining jobs according to the number of shares assigned to the other remaining jobs.

3. The method of claim 1, wherein provisioning the jobs further involves:
    sorting the jobs in descending order based on QoS rankings; and
    iteratively, starting from a job having a highest QoS ranking,
        forming a subgroup by adding a next-in-line job to a previously formed subgroup;
        establishing a resource-usage model for the subgroup; and
        determining a required amount of resources needed by the subgroup based on the resource-usage model for the subgroup and QoS requirement associated with the next-in-line job.

4. The method of claim 3, further comprising:
    making a reservation for the next-in-line job based on a difference between the required amount of resources and reservations made for the previously formed subgroup.

5. The method of claim 3, further comprising:
    in response to at least two jobs having a same QoS ranking, forming a tiered subgroup by adding the at least two jobs as a tier to the previously formed subgroup;
    determining a scale factor for each of the at least two jobs based on resources required by each of the least two jobs; and
    making reservations for each of the at least two jobs based on the scale factor.

6. The method of claim 1, further comprising provisioning the jobs for multiple predetermined time intervals, which involves determining a maximum amount of resources required by a group of one or more jobs over the multiple predetermined time intervals.

7. The method of claim 1, further comprising receiving an isolation parameter which defines a degree of isolation among jobs, wherein provisioning the jobs involves applying the isolation parameter while making reservations for the jobs, and wherein a complete isolation results in making individual reservations for the jobs.

8. A non-transitory computer-readable storage medium storing instructions that when executed by a computer cause the computer to perform a method for provisioning physical resources shared by a plurality of jobs, the method comprising:
    establishing resource-usage models for the jobs;
    ranking the jobs based on quality of service (QoS) requirements associated with the jobs; and
    provisioning the jobs for a predetermined time interval in a such way that any unused reservations associated with a first subset of jobs having higher QoS rankings than other remaining jobs are distributed to the other remaining jobs with preference given to a second subset of jobs having a highest QoS ranking among the other remaining jobs, wherein provisioning the jobs involves making reservations for the jobs based on the resource-usage model and corresponding QoS requirements associated with the jobs.

9. The computer-readable storage medium of claim 8, wherein provisioning the jobs further involves:
    assigning different numbers of shares to the jobs based on corresponding QoS rankings associated with the jobs, wherein the number of shares assigned to a respective job is inversely correlated to the respective job's QoS ranking; and
    assigning reservations based on an assumption that unused reservations associated with the first subset of jobs will be proportionally distributed to the other remaining jobs according to the number of shares assigned to the other remaining jobs.

10. The computer-readable storage medium of claim 8, wherein provisioning the jobs further involves:
    sorting the jobs in descending order based on QoS rankings; and
    iteratively, starting from a job having a highest QoS ranking,
        forming a subgroup by adding a next-in-line job to a previously formed subgroup;

establishing a resource-usage model for the subgroup; and determining a required amount of resources needed by the subgroup based on the resource-usage model for the subgroup and QoS requirement associated with the next-in-line job.

11. The computer-readable storage medium of claim 10, wherein the method further comprises making a reservation for the next-in-line job based on a difference between the required amount of resources and reservations made for the previously formed subgroup.

12. The computer-readable storage medium of claim 10, wherein the method further comprises:

in response to at least two jobs having a same QoS ranking, forming a tiered subgroup by adding the at least two jobs as a tier to the previously formed subgroup;

determining a scale factor for each of the at least two jobs based on resources required by each of the at least two jobs; and making reservations for each of the at least two jobs based on the scale factor.

13. The computer-readable storage medium of claim 8, wherein the method further comprises provisioning the jobs for multiple predetermined time intervals, which involves determining a maximum amount of resources required by a group of one or more jobs over the multiple predetermined time intervals.

14. The computer-readable storage medium of claim 8, wherein the method further comprises receiving an isolation parameter which defines a degree of isolation among jobs, wherein provisioning the jobs involves applying the isolation parameter while making reservations for the jobs, and wherein a complete isolation results in making individual reservations for the jobs.

15. A computing system for provisioning physical resources shared by a plurality of jobs, comprising:

a processor;

a memory;

a resource-usage model constructor configured to construct resource-usage models for the jobs;

a ranking mechanism configured to rank the jobs based on quality of service (QoS) requirements associated with the jobs; and a provisioning mechanism configured to provision the jobs for a predetermined time interval in such a way that any unused reservations associated with a first subset of jobs having higher QoS rankings than other remaining jobs are distributed to the other remaining jobs with preference given to a second subset of jobs having a highest QoS ranking among the other remaining jobs, wherein provisioning the jobs involves making reservations for the jobs based on the resource-usage model and corresponding QoS requirements associated with the jobs.

16. The system of claim 15, wherein while provisioning the jobs the provisioning mechanism is configured to:

assign different numbers of shares to the jobs based on corresponding QoS rankings associated with the jobs, wherein the number of shares assigned to a respective job is inversely correlated to the respective job's QoS ranking; and assign reservations based on an assumption that unused reservations associated with the first subset of jobs will be proportionally distributed to the other remaining jobs according to the number of shares assigned to the other remaining jobs.

17. The system of claim 15, wherein while provisioning the jobs the provisioning mechanism is configured to:

sort the jobs in descending order based on QoS rankings; and iteratively, starting from a job having a highest QoS ranking, form a subgroup by adding a next-in-line job to a previously formed subgroup;

establish a resource-usage model for the subgroup; and determine a required amount of resources needed by the subgroup based on the resource-usage model for the subgroup and QoS requirement associated with the next-in-line job.

18. The system of claim 17, wherein while provisioning the jobs the provisioning mechanism is configured to make a reservation for the next-in-line job based on a difference between the required amount of resources and reservations made for the previously formed subgroup.

19. The system of claim 17, wherein while provisioning the jobs the provisioning mechanism is configured to:

in response to at least two jobs having a same QoS ranking, form a tiered subgroup by adding the at least two jobs as a tier to the previously formed subgroup;

determine a scale factor for each of the at least two jobs based on resources required by each of the at least two jobs; and make reservations for each of the at least two jobs based on the scale factor.

20. The system of claim 15, wherein the provisioning mechanism is further configured to provision the jobs for multiple predetermined time intervals, which involves determining a maximum amount of resources required by a group of one or more jobs over the multiple predetermined time intervals.

21. The system of claim 15, further comprising an isolation module configured to determine an isolation parameter which defines a degree of isolation among jobs, wherein while making reservations for the jobs the provisioning mechanism is configured to apply the isolation parameter, and wherein a complete isolation results in making individual reservations for the jobs.

* * * * *